United States Patent
Yamamoto et al.

(10) Patent No.: US 6,803,695 B2
(45) Date of Patent: Oct. 12, 2004

(54) ARMATURE, MANUFACTURING METHOD OF ARMATURE, AND MOTOR

(75) Inventors: Toshio Yamamoto, Shizuoka-ken (JP);
Keiichi Uemura, Aichi-ken (JP);
Tomoyuki Kikuta, Aichi-ken (JP);
Masahiko Komoda, Aichi-ken (JP);
Masayuki Kuwano, Shizuoka-ken (JP);
Hideki Toida, Shizuoka-ken (JP)

(73) Assignee: ASMO Co., Ltd., Kosai (JP)

( * ) Notice: Subject to any disclaimer, the term of this patent is extended or adjusted under 35 U.S.C. 154(b) by 64 days.

(21) Appl. No.: 10/379,159

(22) Filed: Mar. 4, 2003

(65) Prior Publication Data

US 2003/0201691 A1 Oct. 30, 2003

(30) Foreign Application Priority Data

Mar. 4, 2002 (JP) ........................................ 2002-057498

(51) Int. Cl.⁷ ................................................ H02K 1/22

(52) U.S. Cl. ........................... 310/261; 310/44; 29/598; 403/282

(58) Field of Search ...................... 310/261, 44; 29/596, 29/598; 403/282

(56) References Cited

U.S. PATENT DOCUMENTS

| | | | | |
|---|---|---|---|---|
| 2,756,354 A | * | 7/1956 | Baron | 310/43 |
| 3,737,988 A | * | 6/1973 | Bednarski | 29/596 |
| 4,792,713 A | * | 12/1988 | Bush | 310/217 |
| 4,886,392 A | * | 12/1989 | Iio | 403/282 |
| 5,158,390 A | * | 10/1992 | Ito et al. | 403/282 |
| 5,528,095 A | * | 6/1996 | Strobl | 310/156.12 |
| 5,536,985 A | * | 7/1996 | Ward et al. | 310/44 |
| 6,137,205 A | * | 10/2000 | Hung et al. | 310/261 |
| 6,157,102 A | * | 12/2000 | Suzuki et al. | 310/44 |

FOREIGN PATENT DOCUMENTS

| | | |
|---|---|---|
| DE | 10045549 A1 | 3/2001 |
| JP | 2000-152532 | 5/2000 |
| JP | 2001-086719 | 3/2001 |

* cited by examiner

*Primary Examiner*—Joseph Waks
(74) *Attorney, Agent, or Firm*—Colin P. Cahoon; Carstens, Yee & Cahoon, LLP

(57) ABSTRACT

An armature includes a rotary shaft, a core, and a coupling member. The core is formed by using magnetic metal powder and has a tooth. A wire is wound about the tooth. The coupling member has a ductility that is higher than the ductility of the core. The coupling member is located between the core and the rotary shaft. The rotary shaft is press fitted in the coupling member, and the coupling member is press fitted in the core.

19 Claims, 9 Drawing Sheets

ARMATURE, MANUFACTURING METHOD OF ARMATURE, AND MOTOR

BACKGROUND OF THE INVENTION

The present invention relates to an armature, a method for manufacturing the armature, and a motor. The armature has a core and a wire, which is wound about and is easily detached from core teeth of the core.

There is a great demand for motors that can be easily recycled these days. Motors are compressed and crashed by a shredder to be recycled. An armature is one of components of a motor and has a core. The core is generally made of iron core sheets piled in layers. Therefore, when compressed by the shredder, the core is simply deformed. As a result, teeth of the core are twisted and the wire is not easily removed from the teeth. Thus, the core and the wire that need to be separated are not easily detached from each other.

Japanese Laid-Open Patent Publication 2000-152532 discloses an armature that permits a core and a wire to be easily separated. In the above publication, the core is formed by molding magnetic metal powder. In this case, since the core is highly brittle, or has low ductility, when compressed by a shredder, teeth are broken and each part of the core is crashed so that the wire and the core are easily separated from each other.

However, in the art disclosed in the above publication, a rotary shaft is directly press fitted in the core so that the core is secured to the rotary shaft. Since the core is highly brittle, the press fit allowance needs to be reduced to prevent the core from being broken. Thus, the core of the above publication is particularly not suitable for high-power motors.

Therefore, adhesive is generally applied between the core and the rotary shaft to firmly fix the core to the rotary shaft. However, applying adhesive complicates the procedure, which is not favored. Further, the adhesive is easily affected by temperature changes and the fixing force is reduced by temperature changes.

SUMMARY OF THE INVENTION

Accordingly, it is an objective of the present invention to provide an armature that permits a core to be firmly secured to a rotary shaft, a method for manufacturing the armature, and a motor that uses the armature.

To achieve the above objective, the present invention provides an armature, which includes a rotary shaft, a core, and a coupling member. The core is formed by using magnetic metal powder and has a tooth. A wire is wound about the tooth. The coupling member has ductility that is higher than the ductility of the core. The coupling member is located between the core and the rotary shaft. The rotary shaft is press fitted in the coupling member, and the coupling member is press fitted in the core.

The present invention may also be embodied in a method for manufacturing an armature. The method includes: preparing a rotary shaft; forming a core using magnetic metal powder, wherein the core has a tooth to which a wire is wound; press fitting a coupling member having ductility that is higher than the ductility of the core to the core; and press fitting the rotary shaft to the coupling member, which is press fitted to the core.

The present invention also provides a motor having an armature. The armature includes a rotary shaft, a core, and a coupling member. The core is formed by using magnetic metal powder and has a tooth. A wire is wound about the tooth. The coupling member has ductility that is higher than the ductility of the core. The coupling member is located between the core and the rotary shaft. The rotary shaft is press fitted to the coupling member, and the coupling member is press fitted to the core.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 to 3.

Figure 1:
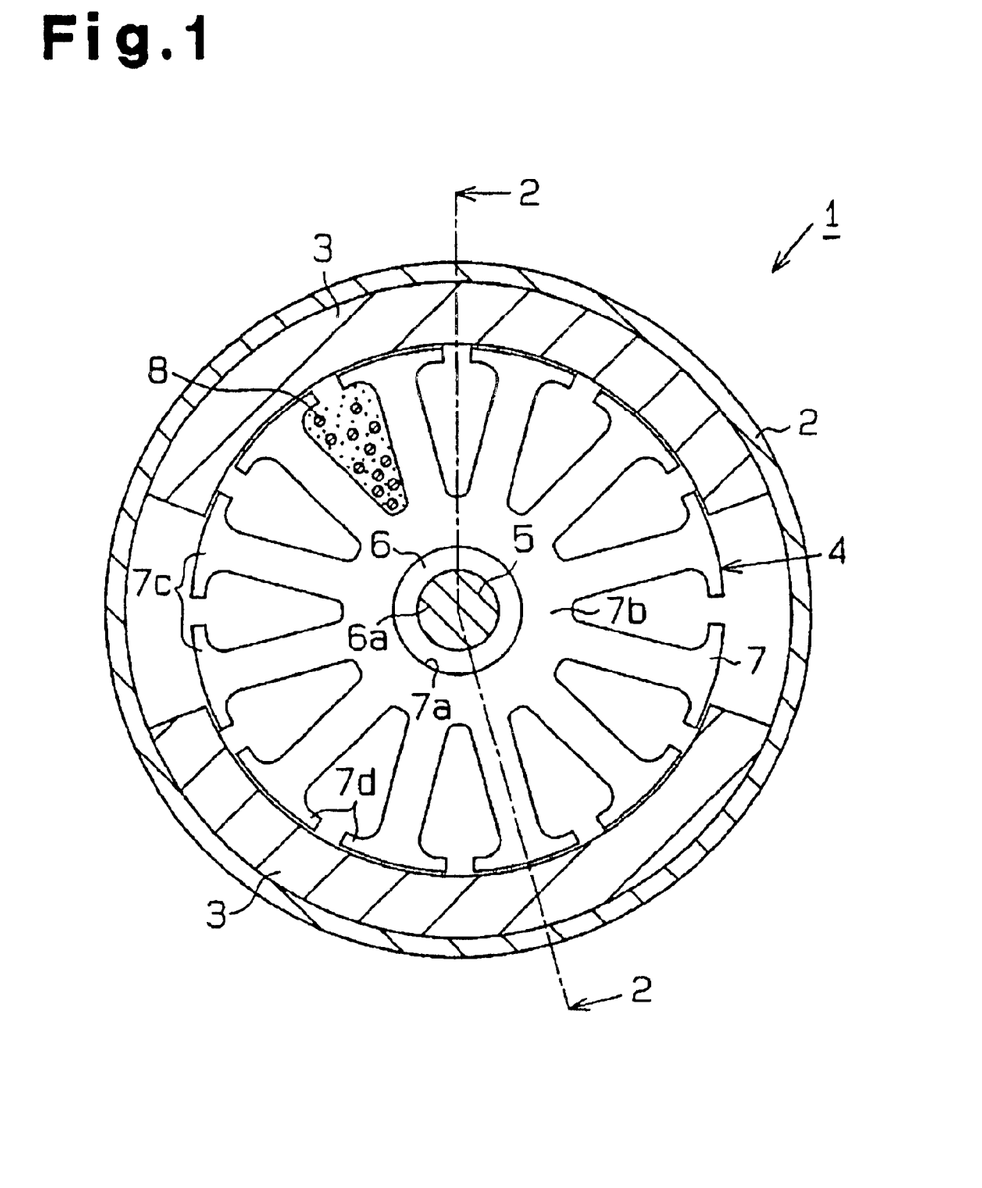
FIG. 1 is a cross-sectional view illustrating a motor according to a first embodiment of the present invention.

FIG. 1 shows a motor 1. The motor 1 has a cylindrical yoke housing 2. A pair of magnets 3 is secured to the inner surface of the yoke housing 2. An armature 4 is rotatably housed inside the magnets 3.

Figure 2:
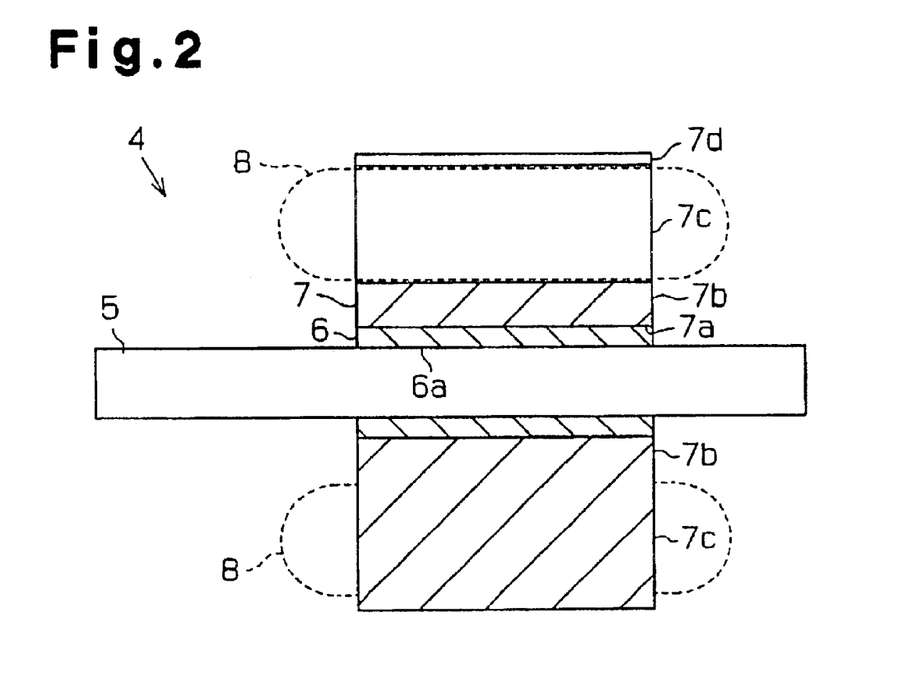
FIG. 2 is a cross-sectional view taken along line 2—2 in FIG. 1.
Figure 3:
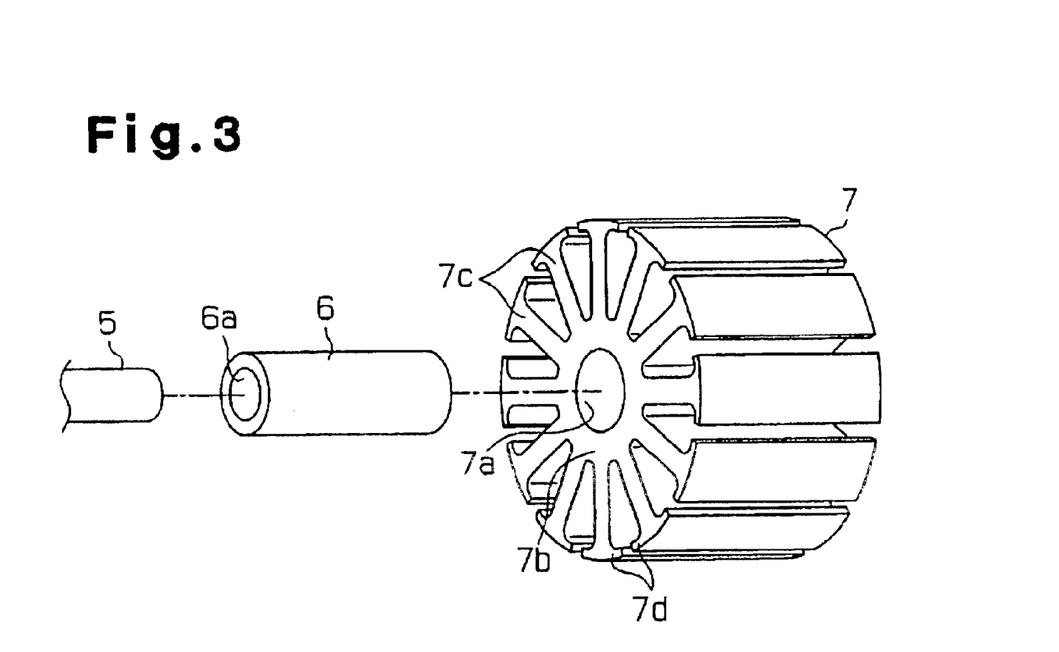
FIG. 3 is an exploded perspective view illustrating an armature of the motor shown in FIG. 1.

As shown in FIGS. 1 to 3, the armature 4 includes a rotary shaft 5, a coupling member 6, a core 7, and a wire 8. The rotary shaft 5 is a columnar rigid body that is made of metal.

The cylindrical coupling member 6 has a through hole 6a, which axially extends through the center and has a circular cross-section. The axial length of the coupling member 6 is the same as that of the core 7. The coupling member 6 is formed by, for example, pressing an iron core sheet. The coupling member 6 has ductility that is greater than that of the core 7. The core 7 has a through hole 7a, which axially extends through the center and has a circular cross-section. The inner diameter of the coupling member 6, in other words, the diameter of the through hole 6a, is smaller than the diameter of the rotary shaft 5 by a predetermined dimension. The outer diameter of the coupling member 6 is greater than the diameter of the through hole 7a of the core 7 by a predetermined dimension. The rotary shaft 5 is press fitted in the through hole 6a of the coupling member 6 and the coupling member 6 is press fitted in the through hole 7a of the core 7. Thus, the rotary shaft 5 is coupled to the core 7 via the coupling member 6.

The core 7 includes a cylindrical base portion 7b, which has the through hole 7a, and teeth 7c, which extend radially outward from the outer circumferential surface of the base portion 7b. A pole shoe 7d is formed at the distal end of each tooth 7c. Each pole shoe 7d is arcuate and extends toward the distal ends of the adjacent teeth 7c to close slots formed between the teeth 7c. The core 7 is formed by sintering (molding) soft magnetic metal powder.

When assembling the armature 4, the coupling member 6 is press fitted in the through hole 7a of the core 7 in advance. Then, the rotary shaft 5 is press fitted in the through hole 6a of the coupling member 6. Alternatively, the rotary shaft 5 may be press fitted in the through hole 6a of the coupling member 6 in advance, and the coupling member 6 may be press fitted in the through hole 7a of the core 7. Then, the wire 8 is either wound about each tooth 7c, which is referred to as a concentrated winding, or wound about several teeth 7c at a time, which is referred to as a distributed winding (only part of the wire 8 is shown in FIG. 1).

Since the core 7 formed by sintering is highly brittle, or has low ductility, the press fit allowance must be small. This reduces the pressure per unit area. However, since the outer diameter of the coupling member 6 is greater than the outer diameter of the rotary shaft 5, the contact area between the core 7 and the coupling member 6 is increased as compared to the contact area between the core and the rotary shaft of the conventional armature in which the rotary shaft is directly press fitted in the core. Thus, the core 7 is firmly secured to the rotary shaft 5. Further, since the coupling member 6 has a high ductility, the press fit allowance can be increased. Thus, the core 7 is firmly secured to the rotary shaft 5. Accordingly, the core 7 is firmly secured to the rotary shaft 5 by using the coupling member 6.

The first embodiment provides the following advantages.

The coupling member 6 is located between the core 7 and the rotary shaft 5. Thus, the structure is simple. Further, the coupling member 6 is less likely to be affected by the temperature as compared to when adhesive is used. Thus, the core 7 is secured to the rotary shaft 5 in a stable manner.

Substantially the entire portion of the core 7, including the teeth 7c, is a sintered compact. Thus, the teeth 7c are easily broken at the proximal ends. Therefore, when the wire 8 is wound about several teeth 7c at a time (distributed winding), the wire 8 is easily separated from the core 7 by breaking the teeth 7c at the proximal ends. Therefore, the core 7 of the first embodiment is particularly effective for the distributed winding.

The coupling member 6 is located between the core 7 and the rotary shaft 5 along the entire length of the core 7. Since the core 7 and the coupling member 6 are in contact along the entire length, the contact-area is increased. Thus, the core 7 is reliably secured to the rotary shaft 5.

The coupling member 6, to which the rotary shaft 5 is press fitted, is cylindrical and the through hole 7a of the core 7, to which the coupling member 6 is press fitted, has a circular cross-section. The shapes of the coupling member 6 and the through hole 7a are simple, which facilitates the manufacture.

If, for example, the coupling member 6 is made of nonmagnetic material, the magnetoresistance between the rotary shaft 5 and the core 7 is increased, which decreases the rotational efficiency. To prevent the rotational efficiency from decreasing, the radial dimension of the base portion 7b of the core 7 needs to be increased. In the first embodiment, the coupling member 6 is made of iron, that is, the magnetic material. Therefore, the magnetoresistance caused between the coupling member 6 and the core 7 and between the coupling member 6 and the rotary shaft 5 is reduced without increasing the diameter of the base portion 7b, which minimizes the size of the core 7. The coupling member 6 is made of iron, that is, the metal material. If the coefficient of thermal expansion between the coupling member 6 and the core 7 greatly differs (for example, when the coupling member 6 is made of material other than metal, such as resin), a backlash could occur between the coupling member 6 and the core 7 or the core 7 could break. However, the coupling member 6 is made of iron, that is, the metal material. Therefore, the coefficient of thermal expansion of the coupling member 6 is the same as that of the core 7. Accordingly, the above mentioned problem is prevented from being caused.

After press fitting the coupling member 6 in the core 7, the rotary shaft 5 is press fitted in the coupling member 6. The contact area between the coupling member 6 and the core 7 is greater than the contact area between the coupling member 6 and the rotary shaft 5. When the rotary shaft 5 is not press fitted in the coupling member 6, the coupling member 6 does not bulge outward, or toward the core 7. Thus, the pressure between the coupling member 6 and the core 7 is relatively small. Therefore, the coupling member 6 is easily press fitted in the core 7. When press fitting the rotary shaft 5 in the coupling member 6, the coupling member 6 is slightly bulged inward, or toward the rotary shaft 5. Thus, the pressure between the coupling member 6 and the rotary shaft 5 is great. However, since the contact area between the coupling member 6 and the rotary shaft 5 is small, the rotary shaft 5 is easily press fitted in the coupling member 6.

A second embodiment of the present invention will now be described with reference to FIGS. 4 to 6. The shapes of an armature 10 and a core 11 of the second embodiment are difference from those of the first embodiment shown in FIGS. 1 to 3.

The core 11 is made by sintering (molding) soft magnetic metal powder. The core 11 has a base portion 11b and teeth 11c. The base portion 11b has a through hole 11a, to which the coupling member 6 is press fitted. The wire 8 is wound about the teeth 11c. A pole shoe lid is formed at the distal end of each tooth 11c. The core 11 is firmly secured to the rotary shaft 5 via the coupling member 6 in the same manner as the first embodiment shown in FIGS. 1 to 3.

The core 11 of the second embodiment includes step portions 11e. Each step portion 11e is a recess formed at the axial end of each teeth 11c about which the wire 8 is wound. The step portions 11e are provided so that the wire 8 does not project in the axial direction. The core 11 of the second embodiment is made by sintering, which permits the steps 11e to be easily formed.

The second embodiment provides the following advantages.

Figure 5:
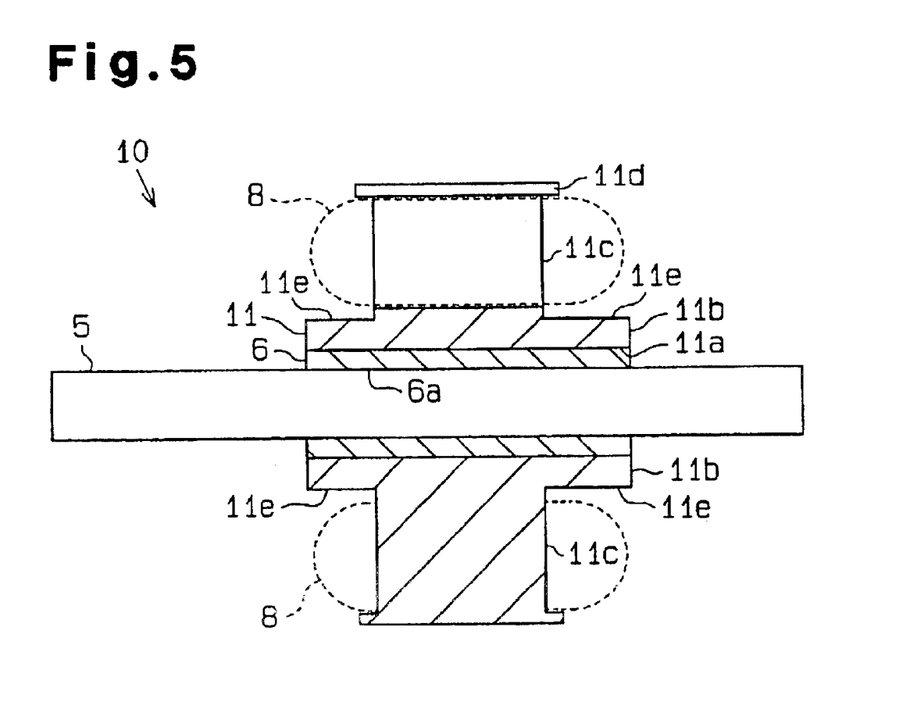
FIG. 5 is a cross-sectional view taken along line 5—5 in FIG. 4.

As shown in FIG. 5, the axial lengths of the teeth 11c to which the wire 8 is wound are shorter than the other part of the core 11. Therefore, the wire 8 is prevented from projecting in the axial direction and the core 11 is minimized in the axial direction.

Although not shown in the drawings, if the axial lengths of the teeth 11c are the same as those of the first embodiment shown in FIG. 2, the base portion 11b becomes longer than the base portion 7b of the first embodiment of FIG. 2. Therefore, the contact surface between the core 11 and the coupling member 6 increases as compared to the case of the first embodiment of FIG. 2. Thus, by press fitting the core 11 to the coupling member 6, the core is firmly secured to the coupling member 6 and the coupling member 6 is firmly secured to the rotary shaft 5. Since the axial length of the base portion 11b is increased as compared to the first embodiment of FIG. 2, the magnetoresistance is decreased compared to the coupling member 6 of FIG. 2.

A third embodiment of the present invention will now be described with reference to FIGS. 7(a) to 9. According to an armature 12 of the third embodiment, the shape of the rotary shaft 5 differs from that of the first embodiment of FIGS. 1 to 3.

Figures 7A, 7B:
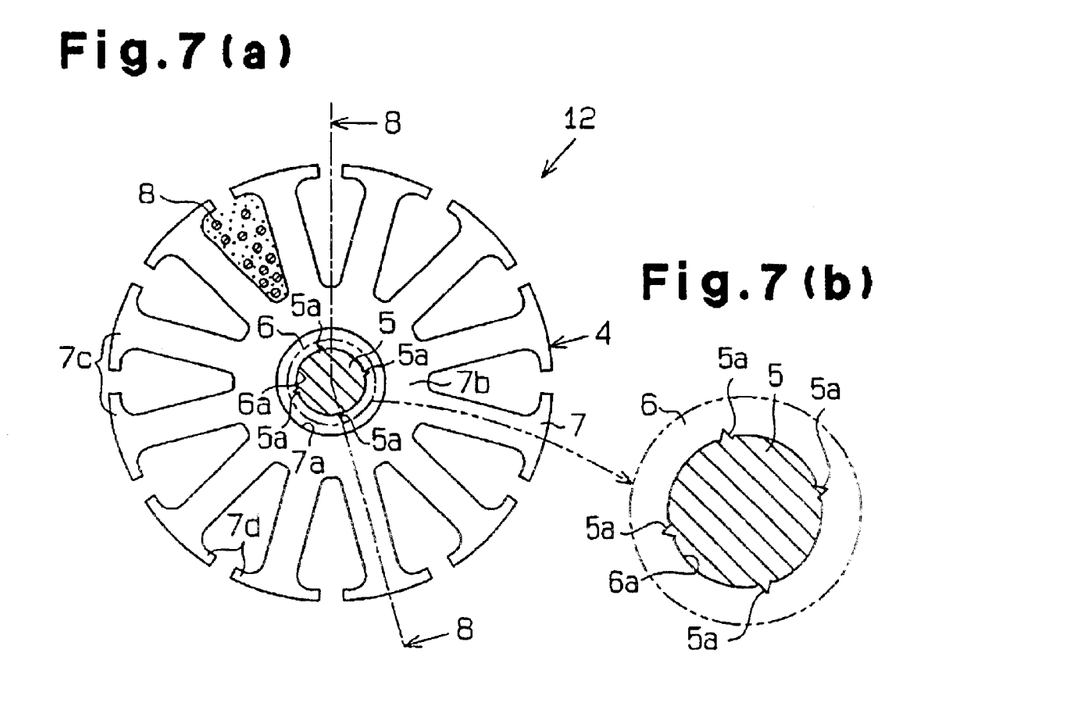
FIG. 7(a) is a plan view illustrating an armature according to a third embodiment.
FIG. 7(b) is an enlarged partial cross-sectional view illustrating the armature in FIG. 7(a)

As shown in FIGS. 7(a) and 7(b), four protrusions 5a are formed on the outer circumferential surface of the rotary shaft 5. Each protrusion 5a has a triangular cross-section and extends in the axial direction. The axial length of the protrusions 5a correspond to the axial length of the portion of the rotary shaft 5 that is press fitted to the coupling member 6 (see FIGS. 8 and 9). The protrusions 5a are arranged at equal angular intervals about the axis of the rotary shaft 5 (90 degrees in the third embodiment). After the coupling member 6 is press fitted in the through hole 7a of the core 7, the rotary shaft 5 is press fitted in the through hole 6a of the coupling member 6. At this time, the rotary shaft 5 is arranged with respect to the core 7 such that the protrusions 5a are aligned with four of the teeth 7c.

The third embodiment provides the following advantages.

The through hole 6a of the coupling member 6 has a circular cross-section, and the rotary shaft 5, which is press fitted in the coupling member 6, has protrusions 5a. Thus, the rotary shaft 5 has a non-circular cross section. That is, the cross-section of the through hole 6a of the coupling member 6 differs from the cross-section of the portion of the rotary shaft 5 that is press fitted in the coupling member. Therefore, the protrusions 5a of the rotary shaft 5 are partially pressed against the coupling member 6 in the circumferential direction. This reduces the sliding resistance between the rotary shaft 5 and the coupling member 6 during press fitting. Therefore, the rotary shaft 5 is easily press fitted in the coupling member 6. Since the protrusions 5a of the rotary shaft 5 are partially pressed against the coupling member 6 in the circumferential direction, the pressed portions engage in the circumferential direction, which improves the fixing force between the rotary shaft 5 and the coupling member 6 particularly in the circumferential direction. The portions of the coupling member 6 against which the protrusions 5a are pressed bulge outward (toward the core 7) when the rotary shaft 5 is press fitted and the coupling member 6 is pressed against the core 7. That is, the coupling member 6 is also partially pressed against the core 7 in the circumferential direction. Therefore, the coupling member 6 is firmly secured to the core 7 particularly in the circumferential direction. Therefore, the rotary shaft 5 is firmly secured to the core 7 via the coupling member 6.

The axial lengths of the protrusions 5a of the rotary shaft 5 are the same as the axial length of the coupling member 6. Therefore, the rotary shaft 5 engages with the coupling member 6 and the coupling member 6 engages with the core 7 evenly along the entire axial length of the core 7 in the circumferential direction. As a result, the rotary shaft 5 is firmly secured to the core 7 via the coupling member 6 in the circumferential direction.

The protrusions 5a of the rotary shaft 5 are arranged at equal angular intervals about the axis of the rotary shaft 5. Therefore, the rotary shaft 5 is engaged with the coupling member 6, and the coupling member 6 is engaged with the core 7 in the circumferential direction in a balanced manner. This efficiently improves the circumferential fixing force among the rotary shaft 5, the coupling member 6, and the core 7.

The teeth 7c are arranged radially outward of the protrusions 5a of the rotary shaft 5. The portions of the coupling member 6 against which the protrusions 5a of the rotary shaft 5 are pressed bulge outward when the rotary shaft 5 is press fitted. Since the teeth 7c are located radially outward of the bulged portions, the rigidity is increased. Therefore, the core 7 sufficiently endures the force applied by the coupling member 6.

A fourth embodiment of the present invention will now be described with reference to FIGS. 10 to 12. The shape of the coupling member 14 and the cross-section of a through hole 7e of the core 7 are different from the first embodiment of FIGS. 1 to 3.

The cross-section of the tubular coupling member 14 is a regular dodecagon. The coupling member 14 has a through hole 14a to which a columnar rotary shaft 5 is press fitted. The cross-section of the through hole 14a is also a regular dodecagon. The cross-section of the through hole 7e of the core 7 is also a regular dodecagon that corresponds to the coupling member 14. The center of each tooth 7c of the core 7 is located radially outward of one of the corners of the through hole 7e. After the coupling member 14 is press fitted in the through hole 7e of the core 7, the rotary shaft 5 is press fitted in the through hole 14a of the coupling member 14.

When press fitted, the rotary shaft 5 is pressed against the flat portions of the through hole 14a of the coupling member 14. That is, the rotary shaft 5 is partially pressed against the coupling member 14 in the circumferential direction. This decreases the sliding resistance generated between the rotary shaft 5 and the coupling member 14 during press fitting. Therefore, the rotary shaft 5 is easily press fitted in the through hole 14a of the coupling member 14. The shapes of the outer circumference of the coupling member 14 and the through hole 7e of the core 7 are regular polygons. Therefore, the coupling member 14 is particularly firmly secured to the core 7 in the circumferential direction. Further, since the coupling member 14 and the through hole 7e of the core 7 have simple shapes, the coupling member 14 and the core 7 are easily formed.

A fifth embodiment of the present invention will now be described with reference to FIGS. 13 and 14.

Figure 13:
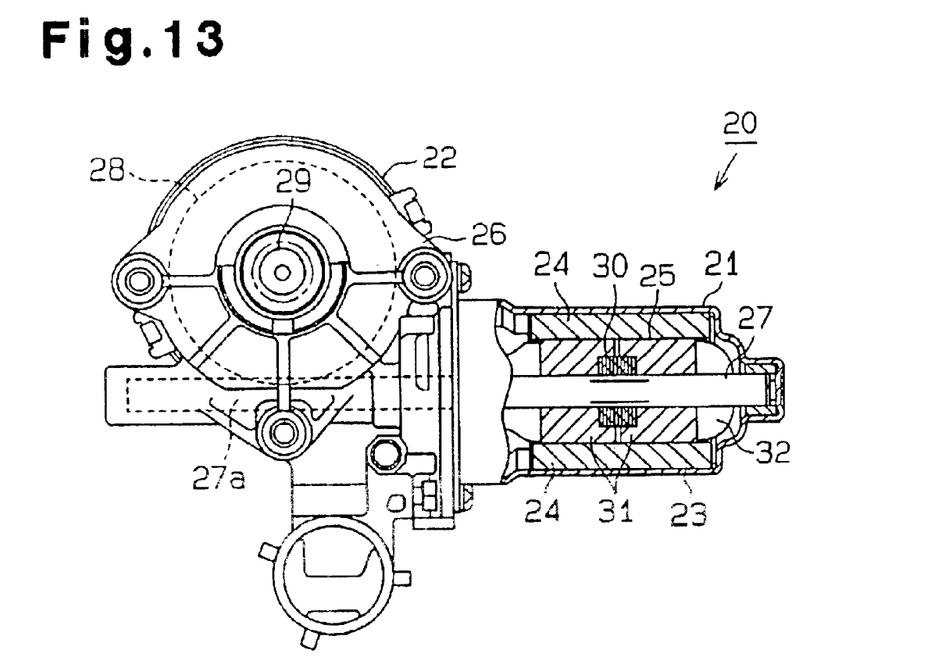
FIG. 13 is a cross-sectional view illustrating a motor according to a fifth embodiment.

As shown in FIG. 13, a motor 20 includes a main body 21 and a reducer 22, which are mounted to each other as one unit. The main body 21 has a substantially cylindrical yoke housing 23. A pair of magnets 24 is secured to the inner side surface of the yoke housing 23. An armature 25 is rotatably accommodated inside the magnets 24. The yoke housing 23, which houses the armature 25, is mounted to a gear housing 26 of the reducer 22. A rotary shaft 27 of the armature 25 projects inside the gear housing 26.

A worm 27a is formed at a predetermined portion of the rotary shaft 27 inside the gear housing 26. Alternatively, a worm shaft on which the worm 27a is formed may be coupled to the rotary shaft 27 to rotate integrally with the rotary shaft 27. The worm 27a is engaged with a worm wheel 28, which is rotatably accommodated inside the gear housing 26. The worm wheel 28 is coupled to an output shaft 29 to rotate integrally with the output shaft 29. When the rotary shaft 27 rotates, the rotation is reduced by the worm 27a and the worm wheel 28, and then transmitted to the output shaft 29.

The armature 25 includes the rotary shaft 27, a coupling member 30, a core 31, and a wire 32. The rotary shaft 27 is a columnar rigid body made of metal.

Figure 14:
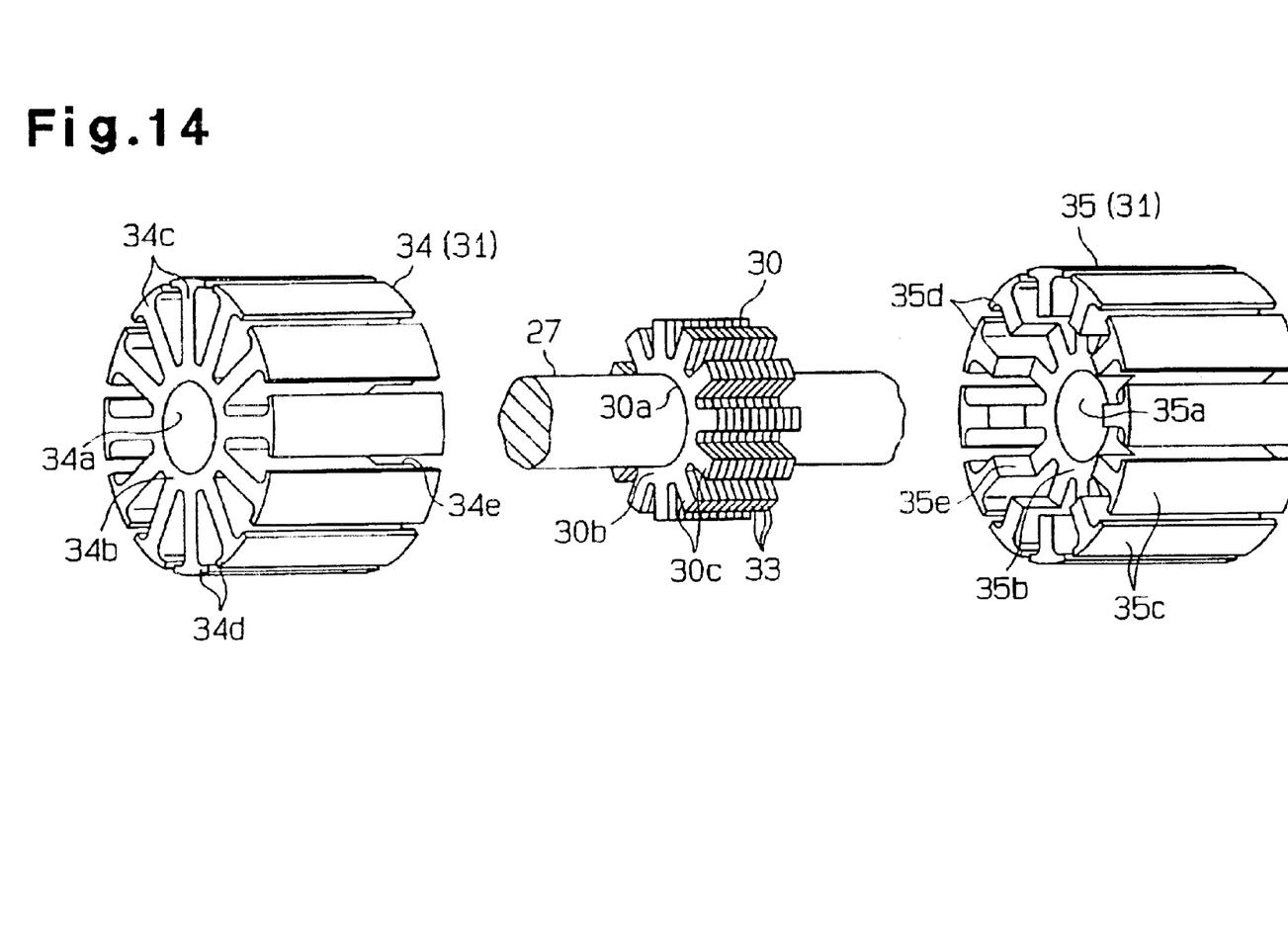
FIG. 14 is an exploded perspective view illustrating the armature shown in FIG. 13.

As shown in FIG. 14, the core 31 includes first and second core members 34, 35 having the same shape with each other. The core members 34, 35 include cylindrical base portions 34b, 35b and teeth 34c, 35c, which extend radially outward from the outer circumferential surface of the base portions 34b, 35b, respectively. The base portions 34b, 35b have through holes 34a, 35a, which extend through the center in the axial direction, respectively. The diameters of the through holes 34a, 35a of the base portions 34b, 35b are smaller than the diameter of the rotary shaft 27 by a predetermined dimension. The rotary shaft 27 is press fitted in the through holes 34a, 35a. A pole shoe 34d, 35d is formed at the distal end of each tooth 34c, 35c, respectively. The pole shoes 34d, 35d extend in the circumferential direction toward the distal end of the adjacent teeth 34c, 35c to close a slot formed between the teeth 34c, 35c.

A coupling recess 34e is formed on one end of the first core member 34, and another coupling recess 35e is formed on one end of the second core member 35. Each of the coupling recesses 34e, 35e is formed on the corresponding base portion 34b or 35b and the corresponding teeth 34c or 35c. The diameters of the coupling recesses 34e, 35e are smaller than the diameter of the projections 30c of the coupling member 30 by a predetermined dimension. The coupling member 30 is press fitted to the coupling recesses 34e, 35e. The first and second core members 34, 35 are made by sintering (molding) soft magnetic metal powder. Therefore, the coupling recesses 34e, 35e are easily formed.

The coupling member 30 includes a cylindrical base portion 30b and projections 30c. The base portion has a through hole 30a, which extends through the center in the axial direction. The projections 30c extend radially outward from the outer circumferential surface of the base portion 30b and form part of the proximal end of the teeth 34c, 35c. The axial length of the coupling member 30 is shorter than the axial length of each core member 34 or 35 by a predetermined length. The inner diameter of the coupling member 30, or the diameter of the through hole 30a, is less than the diameter of the rotary shaft 27 by a predetermined dimension. The outer diameter of the coupling member 30, or the radial distance of the projection 30c, is greater than the diameter of the coupling recess 34e, 35e of each core 34 or 35. When the rotary shaft 27 is press fitted in the through hole 30a of the coupling member 30, each end of the coupling member 30 is press fitted in the coupling recess 34e or 35e of the corresponding core 34, 35. The coupling member 30 is formed by piling iron core sheets 33 in layers. Each core sheet 33 has ductility that is higher than that of the core 31.

When assembling the armature 25, the coupling member 30, which is made by piling the core sheets 33 in layer, is press fitted to the first and second core members 34, 35 so that the coupling member 30 is sandwiched between the first and second core members 34, 35. Then, the rotary shaft 27 is press fitted in the through holes 34a, 35a of the first and second core members 34, 35, and the through hole 30a of the coupling member 30. Alternatively, the rotary shaft 27 may be, in advance, press fitted in the through hole 30a of the coupling member 30. Then, the wire 32 is wound about the teeth 34c, 35c of the first and second core members 34, 35 (distributed winding) to form the armature 25. The wire 32 may be wound about the teeth 34c and the teeth 35c separately (concentrated winding). Part of the wire 32 is wound about the projection 30c of the coupling member 30.

The fifth embodiment provides the following advantages.

The first and second core members 34, 35 are made by sintering and highly brittle. Thus, the fixing force per unit area is small. However, the distal ends of the projections 30c of the coupling member 30 and the axially extended surfaces of the coupling member 30 increase the contact surface between first and second core members 34, 35 and the coupling member 30 as compared to the case when the conventional rotary shaft is directly press fitted to the core. Therefore, the core 31 is firmly secured to the rotary shaft 27. Since the coupling member 30 has a high ductility and the coupling member 30 is firmly secured to the rotary shaft 27, the core 31 is more firmly secured to the rotary shaft 27 via the coupling member 30 as compared to when the rotary shaft 27 is directly press fitted to the core 31. Therefore, the portion where the rotary shaft 27 is directly press fitted to the core 31 and the portion where the coupling member 30 is located between the core 31 and the rotary shaft 27 cooperate to firmly fix the core 31 to the rotary shaft 27.

The core 31 includes the first and second core members 34, 35. The first and second core members 34, 35 are press fitted to the coupling member 30 from both axial ends so that the coupling member 30 is sandwiched in between. Therefore, the core 31 can be press fitted to the rotary shaft 27 and the coupling member 30 along the entire axial length of the core 31 while placing the coupling member 30 axially inward of the core 31.

The coupling member 30 is formed by piling the core sheets 33, which has ductility that is higher than that of the core 31, in layer along the axial direction. The coupling member 30 is easily formed by pressing thin core sheets 33.

For example, if the core sheets 33 are displaced in the circumferential direction when piling the core sheets 33 on one another, a tapered portion is formed by the end surfaces of the adjacent core sheets 33. When press fitting the coupling member 30 having the tapered portion to the core 31, the tapered portion cuts into the coupling recesses 34e, 35e. Thus, the coupling member 30 is more firmly secured to the first and second core members 34, 35.

The coupling member 30 has projections 30c, which form part of the teeth 34c, 35c of the core 31. The wire 32 is wound about the projections 30c. Thus, the coupling member 30 is firmly secured to the core 31 by winding the wire 32.

A sixth embodiment of the present invention will now be described with reference to FIG. 15.

Figure 15:
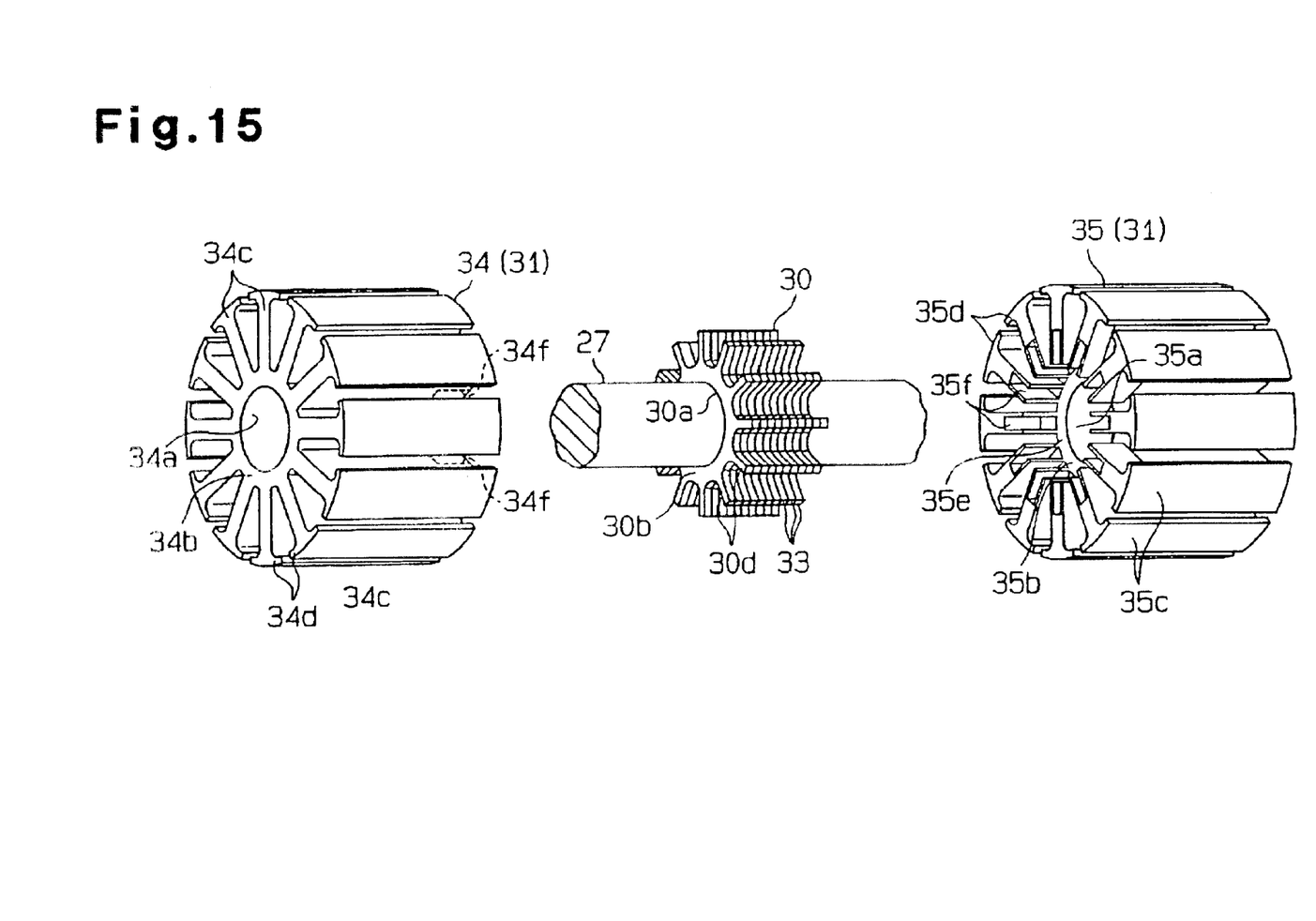
FIG. 15 is an exploded perspective view illustrating an armature according to a sixth embodiment.

As shown in FIG. 15, in the sixth embodiment, the shape of the projections 30d of the coupling member 30 and the shape of the coupling recesses 34e, 35e of the first and second core members 34, 35 differ from those of the fifth embodiment of FIG. 14.

The widths of the projections 30d of the coupling member 30 are smaller than the widths of the teeth 34c, 35c of the first and second core members 34, 35. Engaging recesses 34f, 35f, which engage with the projections 30d of the coupling member 30, are formed in the teeth 34c, 35c (coupling recesses 34e, 35e) of the first and second core members 34, 35, respectively. When the coupling member 30 is mounted to the first and second core members 34, 35, the projections 30d of the coupling member 30 engage with the engaging recesses 34f, 35f of the first and second core members 34, 35. Therefore, the core members 34, 35 are prevented from moving relative to the coupling member 30 in the circumferential direction. Therefore, the coupling member 30 is firmly secured to the core members 34, 35 in the circumferential direction.

It should be apparent to those skilled in the art that the present invention may be embodied in many other specific forms without departing from the spirit or scope of the invention. Particularly, it should be understood that the invention may be embodied in the following forms.

Figure 8:
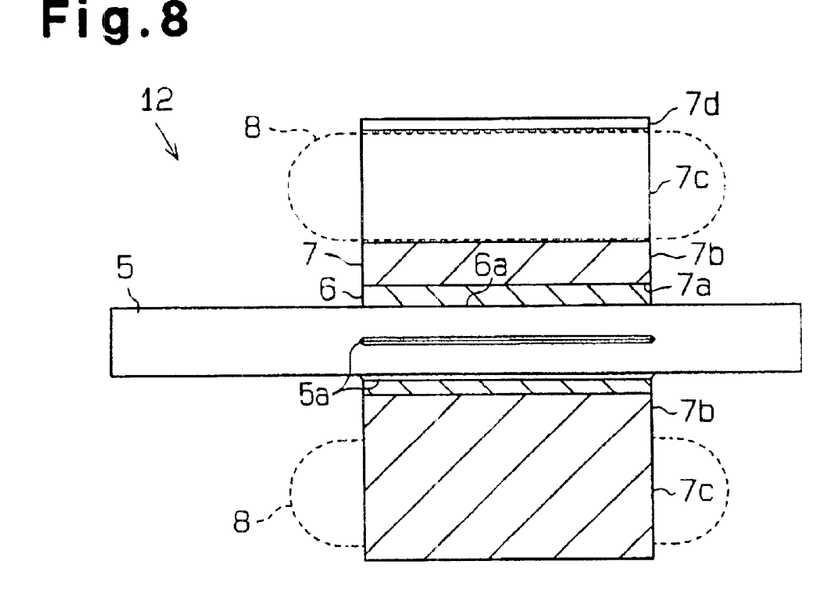
FIG. 8 is a cross-sectional view taken along line 8—8 in FIG. 7.
Figure 9:
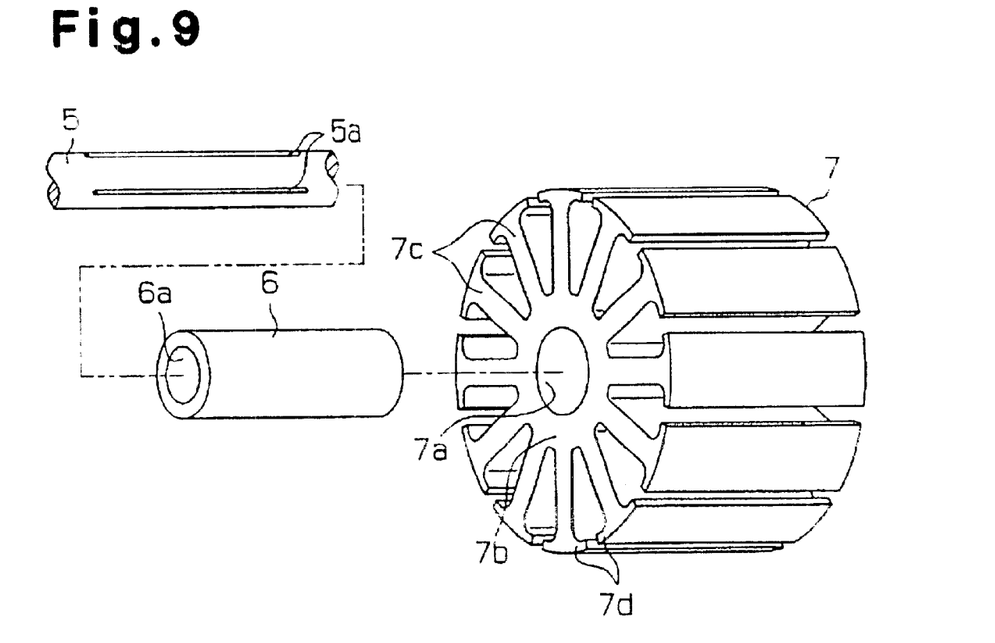
FIG. 9 is an exploded perspective view illustrating the armature shown in FIG. 7.
Figure 10:
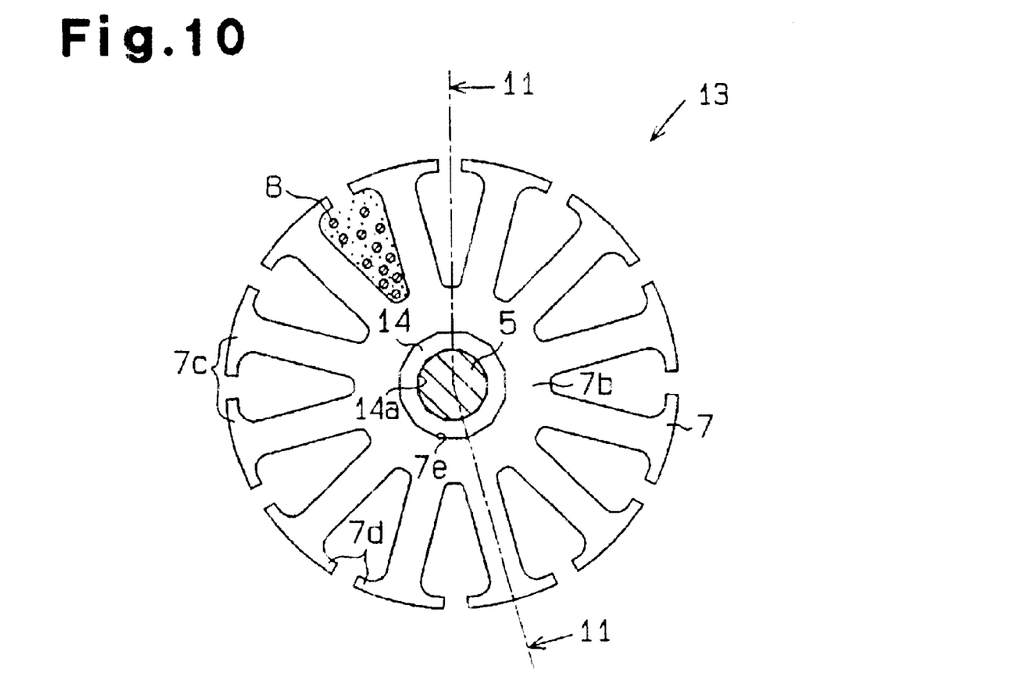
FIG. 10 is a plan view illustrating an armature according to a fourth embodiment.
Figure 11:
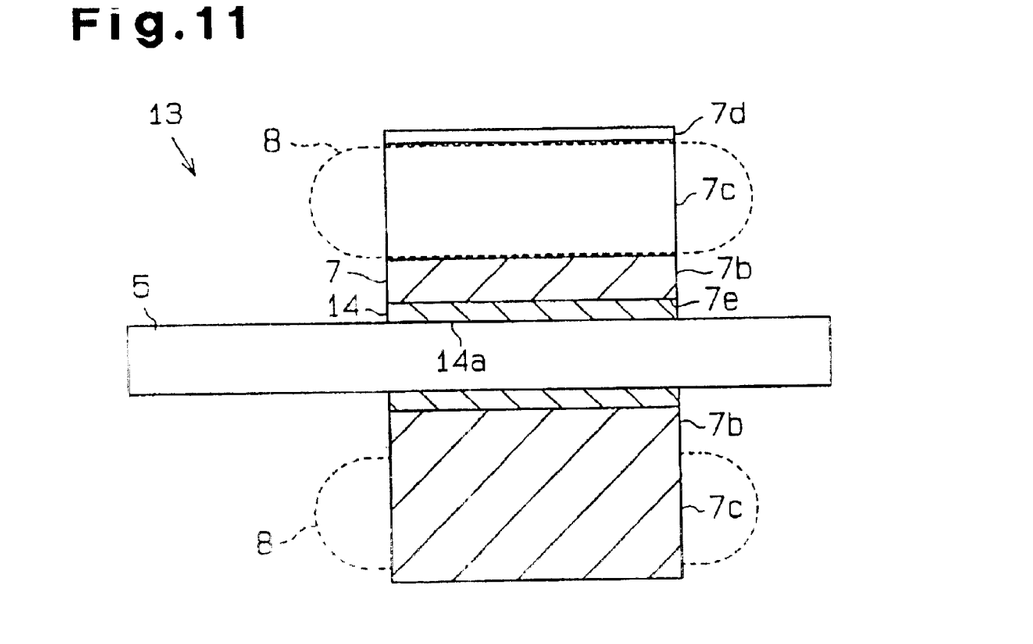
FIG. 11 is a cross-sectional view taken along line 11—11 in FIG. 10.
Figure 12:
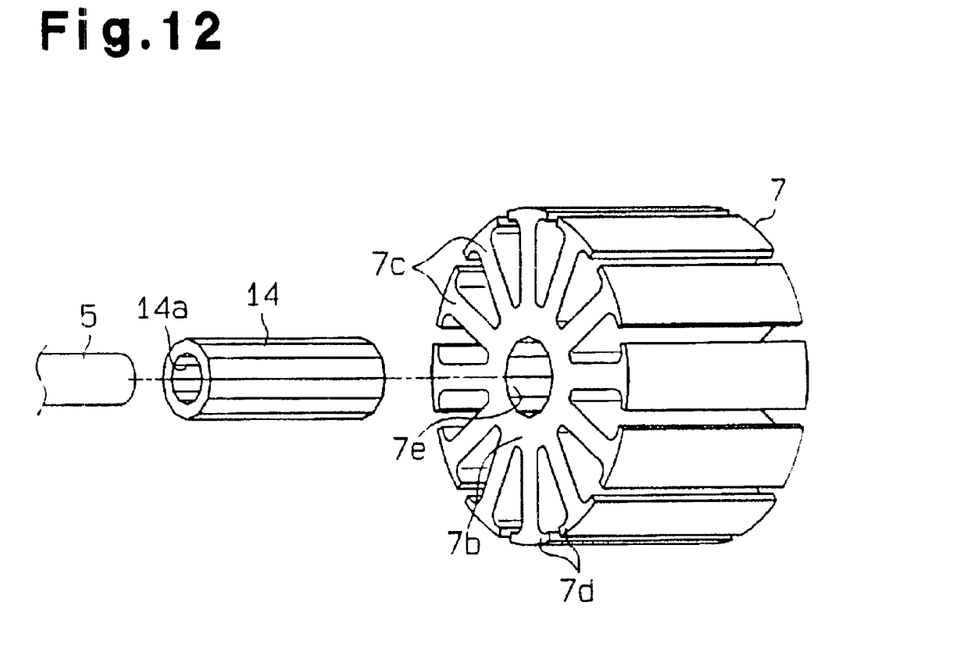
FIG. 12 is an exploded perspective view illustrating the armature shown in FIG. 10.

The shape of the coupling member 6 of the first to third embodiments shown in FIGS. 1 to 9, and the shape of the coupling member 14 of the fourth embodiment shown in FIGS. 10 to 12 may be modified as required. For example, the coupling member 6, 14 may be a tubular body having a polygonal outer side surface other than a regular dodecagon or a tubular body having a gear shaped outer side surface. The cross-sections of the rotary shaft 5 and the through holes 7a, 7e, 11a of the core 7, 11 may be changed in accordance with the change of the coupling member 6, 14 of the first to fourth embodiment shown in FIGS. 1 to 12.

In the third embodiment shown in FIGS. 7 to 9, the number, shape, location, and the like of the protrusions 5a formed on the outer circumferential surface of the rotary shaft 5 may be modified as required.

In the first to fourth embodiments shown in FIGS. 1 to 12, the axial length of the coupling member 6, 14 may be shorter than the axial length of the core 7, 11. On the contrary, the axial length of the coupling member 6, 14 may be longer than the axial length of the core 7, 11.

In the first to fourth embodiments shown in FIGS. 1 to 12, the coupling member 6, 14 may be formed by piling the core sheets 33 in the axial direction as in the fifth and sixth embodiments shown in FIGS. 13 to 15.

In the first to fourth embodiments shown in FIGS. 1 to 12, the core 7, 11 may be divided in the axial direction.

In the fifth and sixth embodiments shown in FIGS. 13 to 15, the coupling member 30 may be a single component member.

In the fifth and sixth embodiments shown in FIGS. 13 to 15, the shape of the coupling member 30 may be changed as required. For example, the coupling member 30 may be cylindrical as in the first to fourth embodiments shown in FIGS. 1 to 12. In this case, the cross-section of the through holes 34a, 35a of the first and second cores 34, 35 are changed in accordance with the shape of the coupling member 30.

In the fifth and sixth embodiments shown in FIGS. 13 to 15, the axial length of the coupling member 30 may be the same as the axial length of the core 31 as in the first to fourth embodiments shown in FIGS. 1 to 12. The axial length of the coupling member 30 may also be longer than that of the core 31.

The core 31 according to the fifth and sixth embodiments shown in FIGS. 13 to 15 may be a single component member. In this case, the coupling member 30 should be located at the end of the core 31 or the axial length of the coupling member 30 should be the same as that of the core 31.

Figure 4:
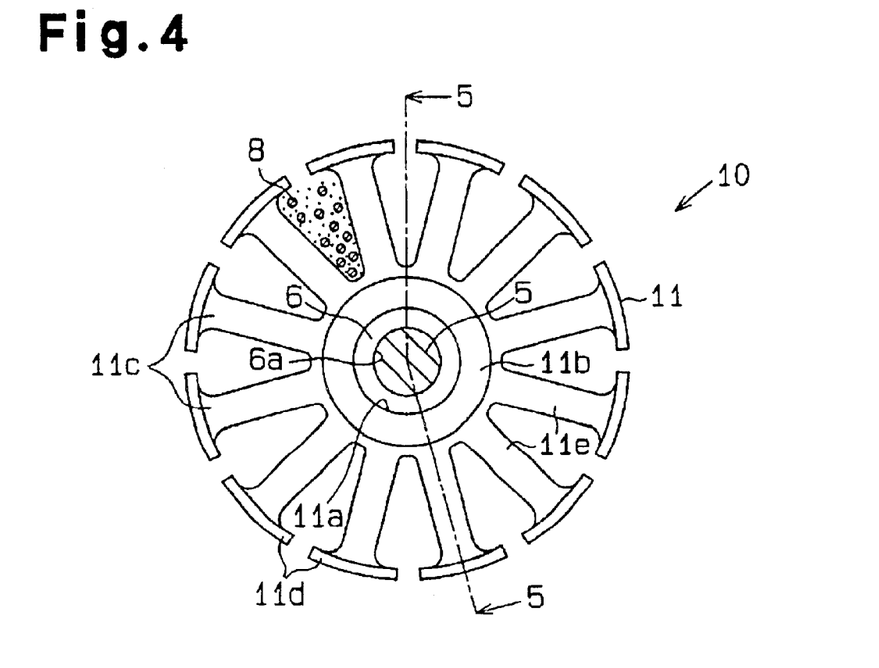
FIG. 4 is a plan view illustrating an armature according to a second embodiment.
Figure 6:
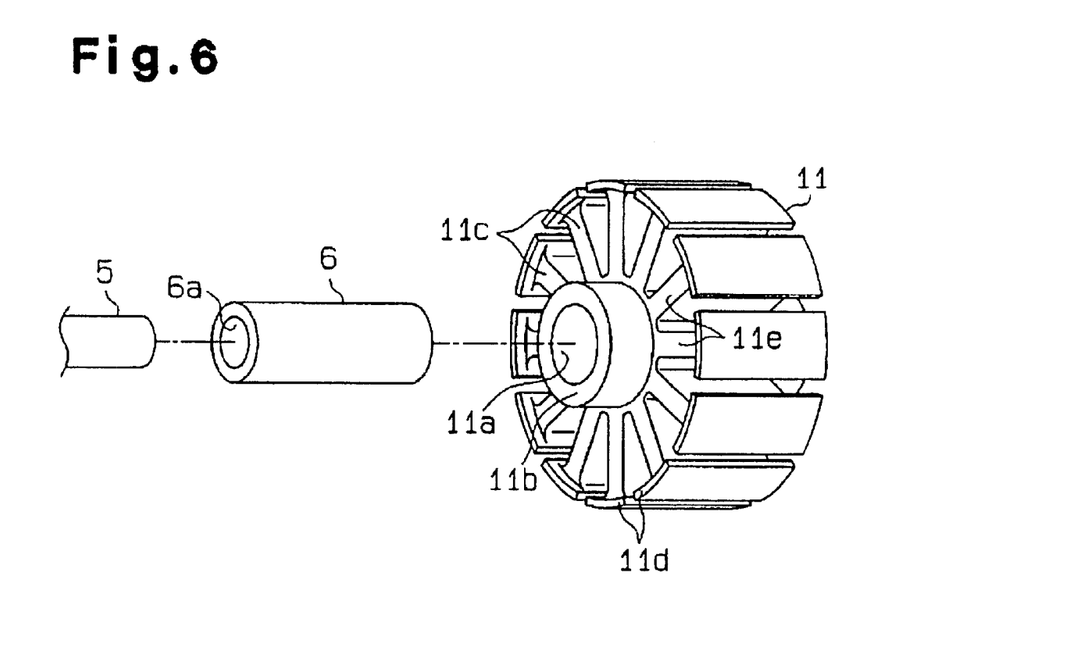
FIG. 6 is an exploded perspective view illustrating the armature shown in FIG. 4.

In the fifth and sixth embodiments shown in FIGS. 13 to 15, the steps 11e according to the second embodiment shown in FIGS. 4 to 6 may be formed on the core 31 such that the wire 32 does not project outside in the axial direction.

In the first to sixth embodiments shown in FIGS. 1 to 15, the coupling member 6, 30 may be formed of magnetic material other than iron or material other than magnetic material.

In the first to sixth embodiments shown in FIGS. 1 to 15, the structure of the motor 1, 20 and the armature 4, 10, 25 may be modified as required in the manner other than those mentioned above.

Therefore, the present examples and embodiments are to be considered as illustrative and not restrictive and the invention is not to be limited to the details given herein, but may be modified within the scope and equivalence of the appended claims.

What is claimed is:

1. An armature comprising:
   a rotary shaft;
   a core formed by using magnetic metal powder, wherein the core has a tooth, and wherein a wire is wound about the tooth; and
   a coupling member having a ductility that is higher than the ductility of the core, wherein the coupling member is located between the core and the rotary shaft, and wherein the rotary shaft is press fitted in the coupling member, and the coupling member is press fitted in the core.

2. The armature according to claim 1, wherein the coupling member is formed of metal material.

3. The armature according to claim 2, wherein the coupling member is formed of magnetic material.

4. The armature according to claim 1, wherein the coupling member is located between the core and the rotary shaft along the entire axial length of the core.

5. The armature according to claim 1, wherein the core has, in the axial direction, a portion to which the coupling member is press fitted and a portion to which the rotary shaft is press fitted.

6. The armature according to claim 5, wherein the core is axially separated into a first core member and a second core member, wherein the coupling member is press fitted to the core such that the coupling member is sandwiched at the axial ends between the first and second core members.

7. The armature according to claim 1, wherein the axial length of a portion of the tooth to which the wire is wound is shorter than the axial length of the remaining portion of the core in the axial direction of the core.

8. The armature according to claim 1, wherein the rotary shaft is columnar, and the coupling member is cylindrical and has a through hole having a circular cross-section to which the rotary shaft is press fitted, and wherein the core has a through hole having a circular cross-section to which the coupling member is press fitted.

9. The armature according to claim 1, wherein the rotary shaft is columnar, and the coupling member is a regular polygonal tube and has a through hole having a regular polygonal cross-section to which the rotary shaft is press fitted, and wherein the core has a through hole having a regular polygonal cross-section to which the coupling member is press fitted.

10. The armature according to claim 1, wherein the coupling member has a through hole to which the rotary shaft is press fitted, and wherein the cross section of the through hole differs from the cross section of at least part of the rotary shaft that is press fitted to the coupling member.

11. The armature according to claim 10, wherein a protrusion is formed on the outer circumferential surface of at least portion of the rotary shaft that is press fitted to the coupling member.

12. The armature according to claim 11, wherein the axial length of the protrusion of the rotary shaft is the same as the axial length of the portion of the rotary shaft that is press fitted to the coupling member.

13. The armature according to claim 11, wherein the protrusion is one of a plurality of protrusions, and wherein the protrusions are arranged at equal angular intervals about the axis of the rotary shaft.

14. The armature according to claim 11, wherein the protrusion and the tooth of the core are aligned in the radial direction.

15. The armature according to claim 1, wherein the coupling member has a projection, which forms part of the tooth of the core.

16. The armature according to claim 15, wherein the width of the projection is less than the width of the tooth, and wherein an engaging recess, which engages with the projection of the coupling member, is formed in the tooth of the core to prevent the core from shifting in the circumferential direction relative to the coupling member.

17. The armature according to claim 1, wherein the coupling member is formed by piling core sheets in layers in the axial direction, and wherein the core sheets have ductility that is higher than the ductility of the core.

18. A method for manufacturing an armature, the method comprising:

preparing a rotary shaft;

forming a core using magnetic metal powder, wherein the core has a tooth to which a wire is wound;

press fitting a coupling member having a ductility that is higher than the ductility of the core to the core; and press fitting the rotary shaft to the coupling member, which is press fitted to the core.

19. A motor having an armature, the armature comprising:

a rotary shaft;

a core formed by using magnetic metal powder, wherein the core has a tooth, and wherein a wire is wound about the tooth; and a coupling member having a ductility that is higher than the ductility of the core, wherein the coupling member is located between the core and the rotary shaft, and wherein the rotary shaft is press fitted to the coupling member, and the coupling member is press fitted to the core.

\* \* \* \* \*